US011532300B1

(12) United States Patent
Bone et al.

(10) Patent No.: US 11,532,300 B1
(45) Date of Patent: Dec. 20, 2022

(54) SYSTEM TO DETERMINE SENTIMENT FROM AUDIO DATA

(71) Applicant: AMAZON TECHNOLOGIES, INC., Seattle, WA (US)

(72) Inventors: Daniel Kenneth Bone, Somerville, MA (US); Viktor Rozgic, Belmont, MA (US); Chao Wang, Newton, MA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 157 days.

(21) Appl. No.: 16/913,996

(22) Filed: Jun. 26, 2020

(51) Int. Cl.
  *G10L 15/18* (2013.01)
  *G10L 15/16* (2006.01)

(52) U.S. Cl.
  CPC .......... *G10L 15/1815* (2013.01); *G10L 15/16* (2013.01)

(58) Field of Classification Search
  CPC ........................... G10L 15/1815; G10L 15/16
  See application file for complete search history.

(56) References Cited

U.S. PATENT DOCUMENTS

| | | | | |
|---|---|---|---|---|
| 2011/0295607 A1* | 12/2011 | Krishnan | ................ | G10L 17/26 704/E11.001 |
| 2017/0084295 A1* | 3/2017 | Tsiartas | .................... | G10L 17/08 |
| 2019/0362022 A1* | 11/2019 | Haukioja | ................ | G10L 15/04 |
| 2020/0126584 A1* | 4/2020 | Huang | .................... | G06F 40/30 |
| 2020/0365275 A1* | 11/2020 | Barnett | ................ | A61B 5/4088 |
| 2020/0380358 A1* | 12/2020 | Kemertas | ............. | G06N 3/0454 |

OTHER PUBLICATIONS

"Cosine Similarity", Wikipedia Entry for definition of Cosine Similarity, 6 pgs. Retrieved from the Internet on: Jun. 17, 2020 URL: https://en.wikipedia.org/wiki/Cosine_similarity.
"Latent Sematic Analysis", Wikipedia Entry for definition of Latent Sematic Analysis, 12 pgs. Retrieved from the Internet on: Jun. 25, 2020 URL: https://en.wikipedia.org/wiki/Latent_semantic_analysis.
"Word2vec", Wikipedia Entry for definition of Word2vec, 6 pgs. Retrieved from the Internet on: Jun. 25, 2020 URL: https://en.wikipedia.org/wiki/Word2vec.

(Continued)

*Primary Examiner* — Stella L. Woo
(74) *Attorney, Agent, or Firm* — Lindauer Law, PLLC (57) ABSTRACT

A device with a microphone acquires audio data of a user's speech. A neural network accepts audio data as input and provides sentiment data as output. The neural network is trained using training data based on input from raters who provide votes as to which sentiment descriptors they think are associated with a sample of speech. A vote by a rater assessing the sample for a particular semantic descriptor is distributed to a plurality of semantically similar semantic descriptors. Semantic descriptor similarity data indicates relative similarity between possible semantic descriptors in the semantic space. The distributed partial votes may be aggregated to produce training data comprising samples of speech and weights of corresponding semantic descriptors. The training data is then used to train the neural network. For example, the neural network may be trained with the training data using per-instance cosine similarity loss or correlational loss.

20 Claims, 5 Drawing Sheets

(56) References Cited

OTHER PUBLICATIONS

Chaubard, et al., "CS 224D Deep Learning for NLP", Standford Lecture Notes Part 1, 2016, 10 pgs. Retrieved from the Internet: URL: https://cs224d.stanford.edu/lecture_notes/notes1.pdf.
Landauer, et al., "An Introduction to Latent Sematic Analysis", Discourse Processes, 1998, 41 pgs. Retrieved from the Internet: URL: http://lsa.colorado.edu/papers/dp1.LSAintro.pdf.
Schroff, et al., "FaceNet: A Unified Embedding for Face Recognition and Clustering", Jun. 17, 2015, 10 pgs. Retrieved from the Internet: URL: https://arxiv.org/pdf/1503.03832v3.pdf.
Sun, et al., "A Simple Approach to Learn Polysemous Word Embeddings", Aug. 14, 2017, 9 pgs. Retrieved from the Internet: URL: https://arxiv.org/pdf/1707.01793.pdf.

* cited by examiner

SYSTEM TO DETERMINE SENTIMENT FROM AUDIO DATA

BACKGROUND

Participants in a conversation may be affected by the emotional state of one another as perceived by their voice. For example, if a speaker is excited a listener may perceive that excitement in their speech. However, a speaker may not be aware of the emotional state that may be perceived by others as conveyed by their speech.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A person's wellbeing and emotional state are interrelated. A poor emotional state can directly impact a person's health, just as an illness or other health event may impact a person's emotional state. A person's emotional state may also impact others that they communicate with. For example, a person who speaks with someone in an angry tone may produce in that listener an anxious emotional response.

Information about the emotional state that they are expressing may be useful to help a person adjust their behavior. Continuing the earlier example, if the angry person is speaking to their friend, the friend may let them know. With that awareness, the angry person may then be able to modify their behavior. As useful as this feedback is, it is infeasible to have a friend constantly present who is able to tell a person what the emotional state expressed in their voice is.

Described in this disclosure are techniques and systems for training and then processing audio data of a user's speech to determine sentiment data indicative of emotional state. The sentiment data may then be presented as output in a user interface to the user.

Before use, the user authorizes the system to process their speech. For example, the user may enroll to use the system, and consent to acquisition and processing of audio of the enrolled user's speech. Raw audio as acquired from one or more microphones is processed to provide audio data that is associated with the enrolled user. The speech acquired comprises a plurality of individual utterances. An utterance may comprise a syllable, phrase, or sentence of spoken words, filler sounds, and so forth that is separated from another phrase by some minimum interval of time. This audio data is then processed to determine audio feature data representative of these individual utterances. For example, the audio feature data may be processed by a neural network to generate feature vectors representative of the audio data and changes in the audio data.

The audio feature data is then processed to determine sentiment data for that utterance of the enrolled user. For example, the system discards audio data that is not associated with the enrolled user and generates the audio feature data from the audio data that is associated with the enrolled user. After the audio feature data is generated, the audio data of the enrolled user may be discarded.

Utterances may be relatively short in duration, extending from fractions of a second to perhaps a few seconds for a long phrase. The presentation of sentiment data associated with individual utterances is useful. This usefulness may be increased by summarizing the sentiment of the utterances from the enrolled user that have been obtained over a longer span of time rather than an individual utterance. The utterances within a particular interval of time may be grouped into a session.

The system uses one or more machine learning systems, such as neural networks, during operation. A feature analysis module may comprise a neural network that has been trained, using training data, to accept audio feature data as input and provide as output sentiment data comprising one or more sentiment descriptors. For example, the feature analysis module, once trained, may accept audio feature data and provide as output a sentiment descriptor such as "proud".

To produce accurate results, the feature analysis module is trained using training data obtained from one or more raters. For example, a rater may be a human who uses a computing device to present sample audio and then provides input indicative of one or more sentiment descriptors. Accurate training data is needed to train the feature analysis module to provide reliable and useful output. However, the assessment of sentiment associated with a sample of audio is complex. This is particularly true if there are more than a small set of mutually exclusive sentiment descriptors used. For example, a feature analysis module trained to provide as output only one of two sentiment descriptors is feasible, but the output is not particularly useful as actual human sentiment is more nuanced than one of two states. Existing systems perform poorly in these situations for several reasons, including semantic overlap, inconsistent results by a given rater, and variation in results by different raters.

Human languages allow for semantic overlap between sentiment descriptors. For example, multiple sentiment descriptors such as "proud" and "excited" may be simultaneously applicable for an audio sample. Because sentiment descriptors do overlap, sample classification approaches such as assigning selected sentiment descriptors with a "1" and unselected sentiment descriptors with a "0" perform poorly.

The sentiment descriptors assigned by the same rater are also subject to variation. If the same sample audio is presented to the same rater at different times, they may assign different sentiment descriptors. For example, the rater may assign "proud" during a first assessment and "excited" during a second assessment. These variations may be due to a variety of influences, such as perceptual overlap from assessing a previous sample, personal emotional state, time of day the sample was assessed, and so forth.

Variation between raters also occurs. While assessing the same sample audio, the first rater may assign "proud" while a second rater assigns "excited" and a third rater assigns "carefree". These variations may be due to a variety of influences as well, including different linguistic backgrounds, use of an unfamiliar dialect, and so forth.

As a result, different raters may assign different sentiment descriptors to the same sample audio. The rater themselves may be a source of variability, with the first rater assigning the same sample audio different sentiment descriptors at different times.

Described in this disclosure are techniques and systems to develop training data that is used to train a machine learning system to associate one or more sentiment descriptors with at least a portion of audio data of a user speaking. A set of sample data comprising a plurality of sample audio data is presented to a plurality of raters. The raters generate annotated data by reviewing the presentation of sample audio data and assigning one or more sentiment descriptors from a list of predetermined sentiment descriptors.

The annotated data is processed by a semantic similarity determination module to determine semantic descriptor similarity data. In one implementation, the sentiment descriptors assigned to the same sample audio are processed to determine co-occurrence counts of sentiment descriptors. In one implementation a neural network may accept the annotated data and employ a triplet loss function in conjunction with a distance function comprising a mean of the bi-directional mean of maximum cross-set cosine similarities per sentiment descriptor. The output from the semantic similarity determination module comprises semantic descriptor similarity data, in which the set of sentiment descriptors along a first axis are associated with the set of sentiment descriptors along a second axis. A similarity value is indicative of a pairwise relationship between sentiment descriptors. The similarity value may be visualized as related to a distance value in semantic space. For example, the similarity values may indicate a semantic distance between a pair of sentiment descriptors. The similarity value may be bounded between −1 and +1, with a value of +1 indicating a maximum relationship (such as at the intersection of the same sentiment descriptor), 0 indicating no relationship, and −1 indicating an anti-relationship (such as an opposite sentiment). In one implementation, the similarity values may be derived from a cosine distance matrix.

A target smoothing module accepts as input the annotated data and the semantic descriptor similarity data and provides as output training data. As described above, the annotated data provides rater-assigned semantic descriptors from a set of predetermined sentiment descriptors. These semantic descriptors may have some semantic overlap. The annotated data may be conceptualized as a series of individual votes by the raters for a particular semantic descriptor with regard to a particular sample audio. However, as mentioned above, different semantic descriptors may be simultaneously applicable to the particular sample audio.

The target smoothing module uses the semantic descriptor similarity data to "smooth" or distribute those votes across semantically similar target semantic descriptors in the training data. For example, a vote by a single rater for a particular semantic descriptor would be "smoothed" into a set of partial weights that are assigned to the semantic descriptors based on semantic descriptor similarity data. For example, the smoothing provides positive values for semantically similar (related) semantic descriptors as well as negative values for semantically dissimilar (anti-related) semantic descriptors.

The training data, comprising the sample audio data or the audio feature data associated with the sample audio data, the target semantic descriptors, and the smoothed weight, is then used to train a neural network in the feature analysis module. By using the training data that includes the smoothed weights, the neural network of the feature analysis more accurately takes into consideration the semantic similarity of semantic descriptors and the variability of the raters. As a result, the sentiment data determined by the feature analysis module is substantially more accurate. This improved accuracy results in better output data presented to the user, which further improves the utility of this information to the user. This improves the user's ability to assess their performance and adjust future behavior. As a result, the user is better able to improve their overall wellness.

Illustrative System

Figure 1:
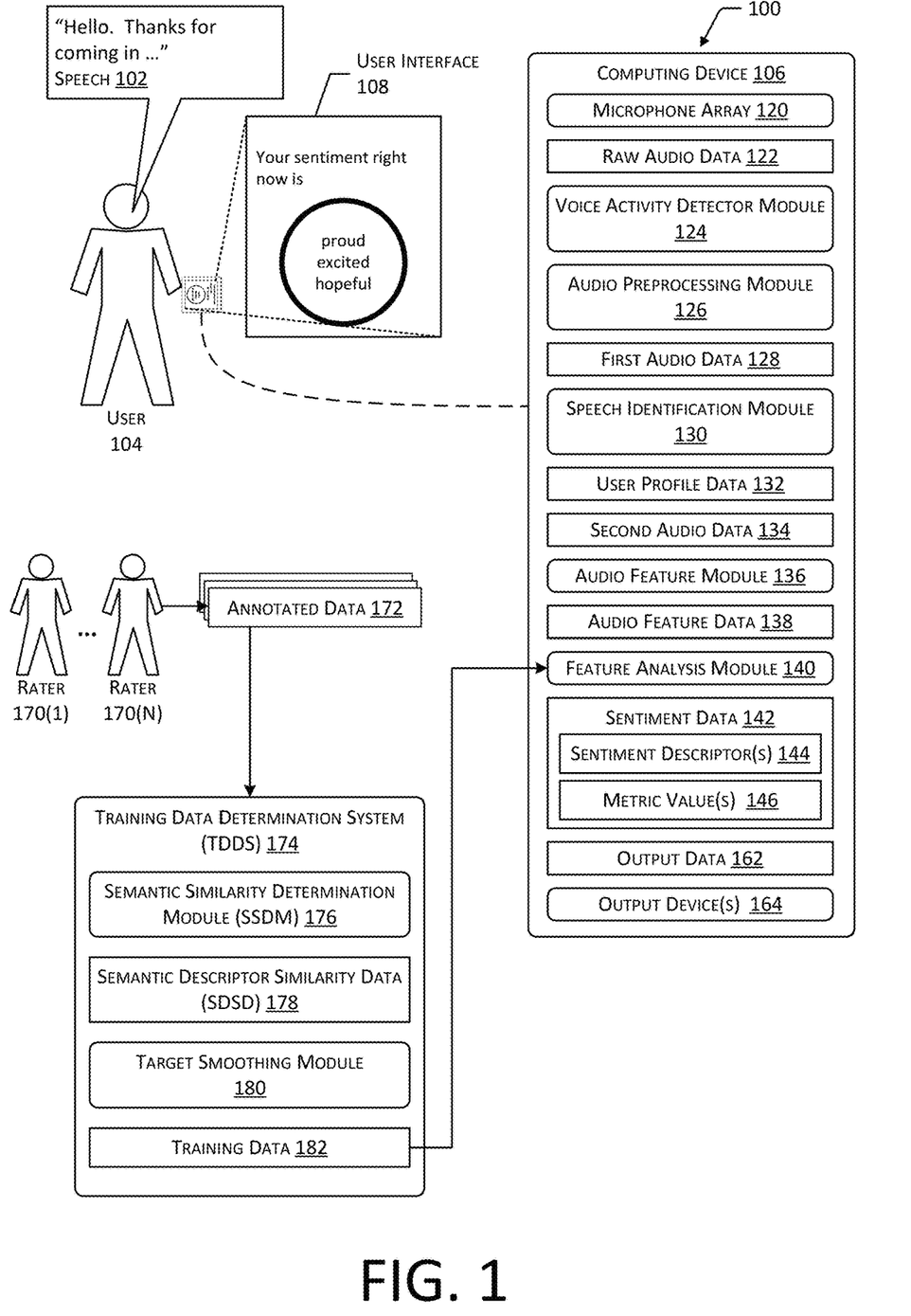
FIG. 1 is an illustrative system that processes speech of a user to determine sentiment data that is indicative of an emotional state as conveyed by the speech, according to one implementation.

FIG. 1 is an illustrative system 100 that processes speech 102 of a user 104 to determine sentiment data that is indicative of an emotional state as conveyed by the speech 102, according to one implementation.

The user 104 may have one or more computing devices 106 on or about their person. The computing device 106 may be implemented in various physical form factors including, but not limited to, the following: wearable devices, smartphones, tablets, laptop computers, network enabled devices, voice activated devices, and so forth. In this illustration, the computing device 106 is depicted as a tablet. In some implementations a wearable device may be used in conjunction with the computing device 106. For example, the wearable device may comprise one or more microphones and provide audio data to the computing device 106.

The computing device 106 may present a user interface 108. The user interface 108 may be a graphical user interface (GUI) as shown here, a voice user interface (VUI), tactile user interface, and so forth.

Speech 102 by the user 104 is detected by a microphone array 120 of the computing device 106 and raw audio data 122 may be acquired. In other implementations raw audio data 122 may be acquired from other devices, such as a wearable device.

A voice activity detector module 124 may be used to process the raw audio data 122 and determine if speech 102 is present. For example, the microphone array 120 may obtain raw audio data 122 that contains ambient noises such as machinery, wind, and so forth. Raw audio data 122 that is not deemed to contain speech 102 may be discarded.

The voice activity detector module 124 may use one or more techniques to determine voice activity. For example, characteristics of the signals present in the raw audio data 122 such as frequency, energy, zero-crossing rate, and so forth may be analyzed with respect to threshold values to determine characteristics that are deemed likely to be human speech. The voice activity detector module 124 may generate data that is indicative of individual utterances within the raw audio data 122. For example, speech sounds may be divided into utterances based on how long a non-speech interval is between determined voice activity. A non-speech interval that is greater than a threshold time, such as 350 milliseconds (ms), may be used to determine a start of a next utterance.

Once at least a portion of the raw audio data 122 has been determined to contain speech 102, an audio preprocessing module 126 may further process this portion to determine first audio data 128. In some implementations, the audio preprocessing module 126 may apply one or more of a beamforming algorithm, noise reduction algorithms, filters, and so forth to determine the first audio data 128. For example, the audio preprocessing module 126 may use a beamforming algorithm to provide directivity or gain and improve the signal to noise ratio (SNR) of the speech 102 from the user 104 with respect to speech 102 or noise from other sources.

A speech identification module 130 may be used to determine that an utterance was spoken by the user 104. The speech identification module 130 may access user profile data 132 to determine if the first audio data 128 is associated with the user 104. For example, user profile data 132 may comprise information about speech 102 provided by the user 104 during an enrollment process. During enrollment, the user 104 may provide a sample of their speech 102 which is then processed to determine features that may be used to identify if speech 102 is likely to be from that user 104. In some implementations the speech identification module 130 may provide a confidence level that is indicative of a likelihood that the utterance is associated with the user 104.

Second audio data 134 is determined that comprises the portion(s) of the first audio data 128 that is determined to be speech 102 from the user 104. For example, the second audio data 134 may consist of the speech 102 which exhibits a confidence level greater than a threshold confidence value of 0.95. As a result, the second audio data 134 omits speech 102 from other sources, such as someone who is in conversation with the user 104.

An audio feature module 136 uses the second audio data 134 to determine audio feature data 138. For example, the audio feature module 136 may use one or more systems such as signal analysis, classifiers, neural networks, and so forth to generate the audio feature data 138. The audio feature data 138 may comprise values, vectors, and so forth. For example, the audio feature module 136 may use a convolutional neural network that accepts as input the second audio data 134 and provides as output vectors in a vector space. The audio feature data 138 may be representative of features such as rising pitch over time, speech cadence, energy intensity per phoneme, duration of a turn, and so forth.

A feature analysis module 140 uses the audio feature data 138 to determine sentiment data 142. Human speech involves a complex interplay of biological systems on the part of the person speaking. These biological systems are affected by the physical and emotional state of the person. As a result, the speech 102 of the user 104 may exhibit changes. For example, a person who is calm sounds different from a person who is excited. This may be described as "emotional prosody" and is separate from the meaning of the words used. For example, in some implementations the feature analysis module 140 may use the audio feature data 138 to assess emotional prosody without assessment of the actual content of the words used.

The feature analysis module 140 determines the sentiment data 142 that is indicative of a possible emotional state of the user 104 based on the audio feature data 138. The sentiment data 142 may comprise one or more sentiment descriptors 144. In some implementations, the sentiment data 142 may comprise one or more metric values 146.

The feature analysis module 140 may comprise a neural network that has been trained using training data 182 provided by a training data determination system 174. For example, the training data 182 may be used to determine the weights within a convolutional neural network that associate particular audio feature data 138 with one or more sentiment descriptors 144. The process of training the neural network comprising the feature analysis module 140 may be performed on another computing device, such as one or more servers.

One or more raters 170(1), 170(2), . . . , 170(N) assess sample audio data to provide annotated data 172 that indicates one or more sentiment descriptors 144 associated with the sample audio data. The annotated data 172 is provided to the training data determination system 174. One implementation of a process to determine the annotated data 172 is discussed with regard to FIG. 2. The training data determination system 174 may comprise a semantic similarity determination module 176. The semantic similarity determination module 176 processes the annotated data 172 to determine semantic descriptor similarity data 178. The semantic descriptor similarity data 178 is data indicative of a pairwise relationship between different semantic descriptors 144 in a predetermined set of semantic descriptors 144. One implementation of a process to determine the semantic descriptor similarity data 178 is discussed with regard to FIG. 2.

A target smoothing module 180 accepts as input the annotated data 172 and the semantic descriptor similarity data 178 and determines training data 182 comprising target semantic descriptors and smoothed weights that are associated with the sample audio. One implementation of a process to determine the training data 182 is discussed with regard to FIG. 3.

The training data 182 may then be used to train a neural network of the feature analysis module 140. One implementation of a process to train the neural network is discussed with regard to FIG. 4.

In some implementations, the feature analysis module 140 may determine various values that are deemed to be representative of emotional state. In some implementations these values may be representative of emotional primitives. (See Kehrein, Roland. (2002). The prosody of authentic emotions. 27. 10.1055/s-2003-40251.) For example, the emotional primitives may include valence, activation, and dominance. A valence value may be determined that is representative of a particular change in pitch of the user's voice over time. Certain valence values indicative of particular changes in pitch may be associated with certain emotional states. An activation value may be determined that is representative of pace of the user's speech over time. As with valence values, certain activation values may be associated with certain emotional states. A dominance value may be determined that is representative of rise and fall patterns of the pitch of the user's voice over time. As with valence values, certain dominance values may be associated with certain emotional states. Different values of valence, activation, and dominance may correspond to particular emotions. (See Grimm, Michael (2007). Primitives-based evaluation and estimation of emotions in speech. Speech Communication 49 (2007) 787-800.)

Other techniques may be used by the feature analysis module 140. For example, the feature analysis module 140 may determine Mel Frequency Cepstral Coefficients (MFCC) of at least a portion of the second audio data 134. The MFCC may then be used to determine an emotional class associated with the portion. The emotional class may include one or more of angry, happy, sad, or neutral. (See Rozgic, Viktor, et. al, (2012). Emotion Recognition using Acoustic and Lexical Features. 13th Annual Conference of the International Speech Communication Association 2012, INTERSPEECH 2012. 1.).

In other implementations the feature analysis module 140 may include analysis of the words spoken and their meaning. For example, an automated speech recognition (ASR) system may be used to determine the text of the words spoken. This information may then be used to determine the sentiment data 142. For example, presence in the second audio data 134 of words that are associated with a positive connotation, such as compliments or praise, may be used to determine the sentiment data 142. In another example, word stems may be associated with particular sentiment categories. The word stems may be determined using ASR, and the particular sentiment categories determined. (See Rozgic, Viktor, et. al, (2012). Emotion Recognition using Acoustic and Lexical Features. 13th Annual Conference of the International Speech Communication Association 2012, INTERSPEECH 2012. 1.) Other techniques may be used to determine emotional state based at least in part on the meaning of words spoken by the user 104.

The sentiment data 142 determined by the feature analysis module 140 may be expressed as one or more numeric values, vectors, words, and so forth. As mentioned previously, the feature analysis module 140 may determine sentiment data 142 comprising one or more sentiment descriptors 144 for a given utterance. These sentiment descriptors 144 may be determined by the feature analysis module 140 directly, such as output from a neural network trained based on training data 182 from the training data determination system 174.

The sentiment data 142 may comprise one or more metric values 146. For example, a weighted sum of the valence, activation, and dominance values of an utterance may be used to generate an overall sentiment index or "tone value" or "mood value" for that utterance. In some implementations a plurality of metrics may be determined for a single utterance. For example, a valence value and an activation value may be determined for an utterance.

In one implementation, the sentiment descriptors 144 may comprise words that are associated with particular combinations of metric values 146, such as valence, activation, and dominance values. In some implementations, the sentiment data 142 may comprise one or more vectors in an n-dimensional space. The sentiment data 142 may comprise values that are non-normative. For example, a metric value 146 that is expressed as a negative number may not be representative of an emotion that is considered to be bad.

The computing device 106 may generate output data 162 from the sentiment data 142. For example, the output data 162 may comprise hypertext markup language (HTML) instructions that, when processed by a browser engine, generate an image of a graphical user interface (GUI). In another example, the output data 162 may comprise an instruction to play a particular sound, operate a buzzer, operate a light to present a particular color at a particular intensity, generate synthesized speech, and so forth.

The output data 162 may then be used to operate one or more output devices 164. Continuing the examples, the GUI may be presented on a display device, a voice user interface comprising synthesized speech may be presented using a speaker, a buzzer may be operated, the light may be illuminated, and so forth to provide output. The output may include the user interface 108, such as the GUI depicted here that provides information about the sentiment for a particular session.

In some implementations sentiment data 142 may be aggregated to provide information about different intervals of time. Sentiment data 142 that is associated with a day, week, month, or other interval of time may be used to determine descriptor data for that interval. For example, a top k (where k is a nonzero positive integer) most frequently occurring sentiment descriptors 144 associated with a session may be selected to represent the sentiment for that session.

It is understood that the various functions, modules, and operations described in this system 100 may be performed by one or more devices. For example, the training data determination system 174 may be performed at least in part by one or more servers. These one or more servers may use the training data 182 to train the neural network used by the feature analysis module 140. The trained neural network, or data corresponding to that training, such as the weights associated with different nodes of the neural network, may then be provided to the computing device 106 for use.

Figure 2:
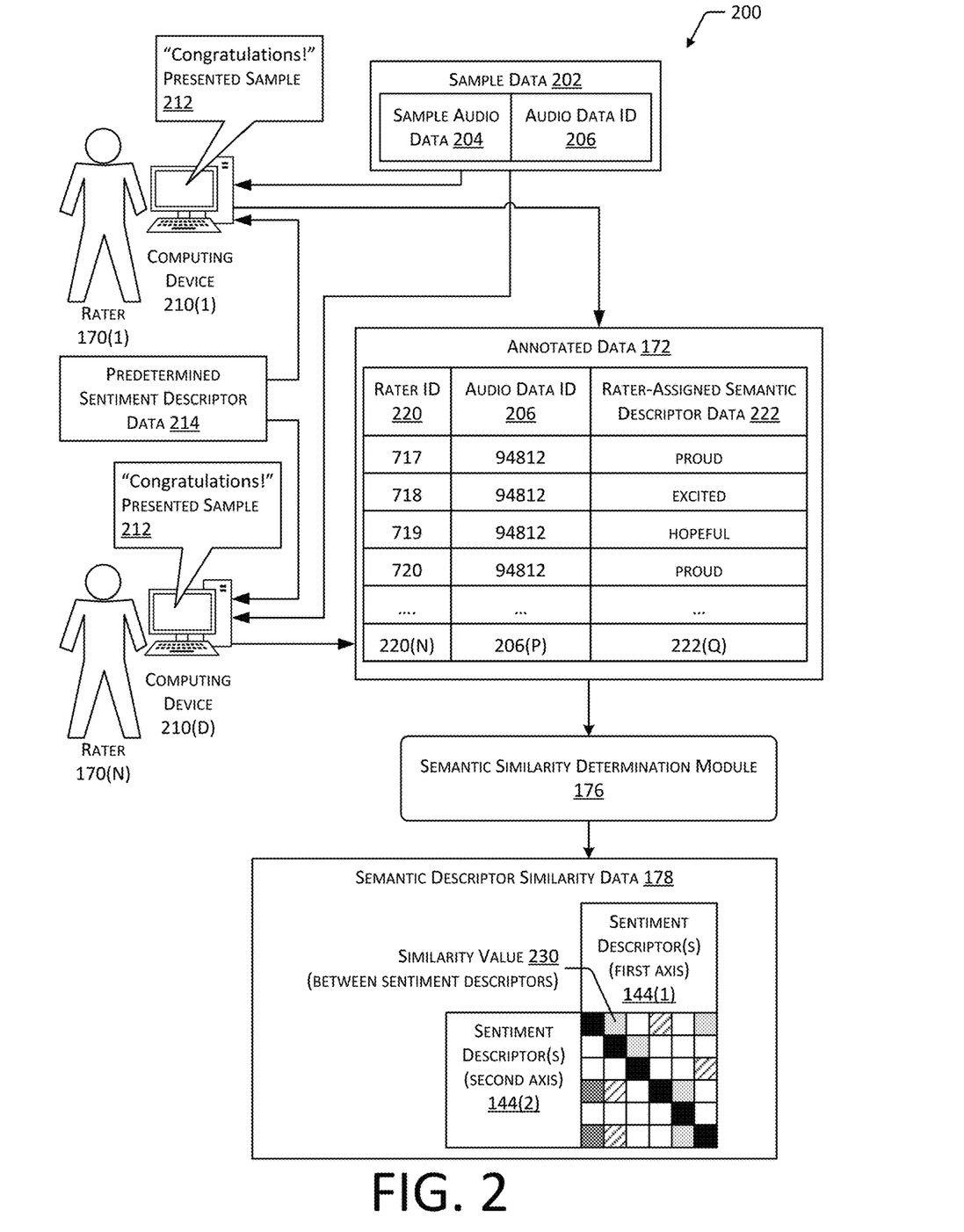
FIG. 2 illustrates determination of annotated data and semantic descriptor similarity data from that annotated data, according to one implementation.

FIG. 2 illustrates determination of annotated data 172 and semantic descriptor similarity data 178 from that annotated data 172, according to one implementation.

Sample data 202 comprising sample audio data 204 is determined. For example, the sample audio data 204 may comprise snippets of speech 102 spoken by performers, spoken by users 104 who have provided affirmative consent to use samples for training, and so forth. The sample data 202 may comprise an audio data identifier (ID) 206 associated with a particular portion of sample audio data 204. For example, the audio data ID 206 may be indicative of a particular file of sample data 202. In another example, the audio data ID 206 may be indicative of a particular portion, such as a particular time interval, of the sample data 202. In yet another example, the audio data ID 206 may comprise a key value that is indicative of a particular entry within a data store.

The sample data 202, or a portion thereof, is provided to one or more computing devices 210(1), 210(2), ..., 210(D) that are associated with the one or more raters 170(1), 170(2), ..., 170(N). For example, the computing device 210 may comprise a desktop computer, laptop computer, table computer, smartphone, network connected device, and so forth.

Predetermined sentiment descriptor data 214 may also be provided to the computing device 210. The predetermined sentiment descriptor data 214 comprises a specified set of sentiment descriptors 144 that will be selected or otherwise designated by the rater 170 as associated with sample audio data 204. For example, the specified set of sentiment descriptors 144 may comprise 70 different words, such as "confused", "excited", "hopeful", "proud", "relieved", and so forth. While the specified descriptors 144 are described as a text string, in other implementations other designations may be used. For example, the specified sentiment descriptors 144 may be number, colors, and so forth. The predetermination sentiment descriptor data 214 may comprise a constrained set or an open-ended set of sentiment descriptors 144. For example, the sentiment descriptors 144 may be limited to a set of 70 sentiment descriptors, to any sentiment descriptor present in a dictionary, and so forth. In some implementations raters 170 may be permitted to add sentiment descriptors to the predetermined sentiment descriptor data 214. For example, a rater 170 may manually enter text for a sentiment descriptor 144. The entered sentiment descriptor 144 may then be incorporated into the predetermined sentiment descriptor data 214. For example, this allows the system 100 to flexibly adapt to changes in language, additions of new terms, and so forth.

During the annotation process, the computing device 210 uses an output device such as a speaker to present the sample audio data 204 as a presented sample 212 to the rater 170. The rater 170 uses an input device associated with the computing device 210 to provide input indicative of one or more sentiment descriptors 144 that the rater 170 believes are associated with the sample audio data 204. For example, the computing device 210 may present the presented sample 212 and show a touch user interface with the 70 possible sentiment descriptors 144 as indicated in the predetermined sentiment descriptor data 214. The rater 170 may touch to provide their input indicative of selection, in order of best fit to least fit, of their perceived top k (such as top three) sentiment descriptors 144.

The input provided by the rater 170 is associated with the sample audio data 204 and used to generate the annotated data 172. In the implementation shown here, the annotated data 172 may comprise a rater identifier (ID) 220 that is indicative of the particular rater 170(1), the audio data ID 206 indicative of the particular sample audio data 204, and rater-assigned semantic descriptor data 222. The rater-assigned semantic descriptor data 222 may comprise one or more semantic descriptors 144 as selected from the predetermined sentiment descriptor data 214. In some implementations, additional data such as a hierarchical rating, scale value, or other input may also be provided. For example, the rater 170 may indicate a value of 1-10 indicating their confidence in the selected semantic descriptor being relevant. In another example, the rater 170 may select semantic descriptors 144 in order of most to least applicable. Continuing the example, the first rater-assigned semantic descriptor may be assigned a rank of 1, the second rater-assigned semantic descriptor may be assigned a rank of 2, and so forth.

The semantic similarity determination module 176 accepts as input at least a portion of the annotated data 172 and provides as output the semantic descriptor similarity data 178. The semantic descriptor similarity data 178 provides information indicative of the pairwise relationship between individual semantic descriptors 144 in the set of predetermined sentiment descriptor data 214. For example, the semantic descriptor similarity data 178 may be represented as a two-dimensional matrix with the sentiment descriptors 144 along each of the two axes. A similarity value 230 at an intersection within the matrix provides an indication as to the degree of relationship between the two sentiment descriptors 144. This degree of relationship may extend from related, to unrelated, to anti-related. For example, the pair of sentiment descriptors 144 "proud" and "excited" may be highly related. In another example, the pair of sentiment descriptors 144 of "proud" and "controlling" are unrelated. In yet another example, the pair of sentiment descriptors of "proud" and "displeased" are anti-related. The similarity value 230 may indicate a semantic distance between a pair of sentiment descriptors 144. In this figure the shading of the box indicates the similarity value 230, with black indicative of highly related, gray indicative of somewhat related, white indicative of unrelated, and crosshatch indicative of highly anti-related.

The predetermined sentiment descriptor data 214 comprises a set of sentiment descriptors 144 that are considered suitable for use in circumstances that are associated with use. However, human languages permit semantic overlap between sentiment descriptors 144. For example, two or more sentiment descriptors 144 may be simultaneously applicable to a particular presented sample 212. Because at least some of the sentiment descriptors 144 may have some overlap in a semantic space, binary or other naïve approaches to sample classification perform poorly when used to generate training data 182. This may be due to dispersion of the training votes across what are naively considered different sentiment descriptors 144 that are actually, if not semantically synonymous, at least highly related. Further complicating the situation, human languages permit polysemy in which a word has more than one meaning. For example, a particular sentiment descriptor 144 may be associated with multiple meanings.

Another approach uses an external mapping, in which a human operator specifies a relationship between different sentiment descriptors 144. However, such external mapping introduces several operational constraints and practical limitations. One operational constraint includes the cost and expense of developing a set of semantic relationships between sentiment descriptors manually. This may involve teams of many people providing input, testing, assessing, and otherwise constructing a mapping that is deemed sufficiently valid. This results in a substantial cost to develop the external mapping. The relationship between different sentiment descriptors 144 may also be specific to combinations of one or more of region, dialect, language, context of the user, and so forth. As a result, the effort involved in determining an external mapping grows as these various combinations would need to be addressed. Without such customization, the resulting output presented to the user may be unreliable. For example, a French-Canadian user speaking English may experience incorrect sentiment data 142 if the external mapping was determined by an Australian English speaker. Ongoing maintenance would also need to be performed to update the external mapping as conditions change. For example, if an additional semantic descriptor 144 is to be added, the external embedding would need to be redone. As a result, external mappings are costly and limited in their usefulness.

Returning to the semantic similarity determination module 176, the techniques described in this disclosure allow the semantic descriptor similarity data 178 to be determined as an embedded mapping that results from input by the raters 170. The raters 170 may be selected to manifest the particular combination of traits associated with the users 104 expected to use the system 100. Continuing the example, a set of raters 170 with native language skills consistent with Quebec may be used to provide annotated data 172 that is used to generate corresponding semantic descriptor similarity data 178. Likewise, a set of raters 170 with native language skills consistent with Australia may be used to provide annotated data 172 that is used to generate corresponding semantic descriptor similarity data 178. By using raters 170 that are consistent with the combination desired, the semantic descriptor similarity data 178 is able to quickly, accurately, and inherently incorporate the unique characteristics associated with that combination without introducing additional complexity.

The use of raters 170 also introduces other variations that the semantic similarity determination module 176 may compensate for during operation. Intra-rater variation involves the same rater 170 assigning different assigned semantic descriptors to the same sample audio data 204 at different times. For example, the same presented sample 212 may be presented to the same rater 170 at different times. The rater 170 may assign a sentiment descriptor 144 of "proud" during a first assessment and "excited" during a second assessment. These variations may be due to many factors, such as perceptual overlap from assessment of a previously presented sample 212, personal emotional state, time of day the sample was assessed, and so forth.

Inter-rater variation involves different raters 170 assigning different semantic descriptors to the same sample audio data 204. For example, assessing the presented sample 212, the first rater 170(1) assigns a sentiment descriptor 144 of "proud" while a second rater 170(2) assigns "excited" and a third rater 170(3) assigns "carefree". These variations may be due to a variety of influences as well, including individual differences of the raters 170, personal emotional state of the rater 170, time of day the sample was assessed, and so forth.

During operation, the semantic similarity determination module 176 is determining the semantic descriptor similarity data 178 based on the information about the sample audio data 204 that was provided as the presented sample 212 and the rater-assigned semantic descriptor data 222. During operation, the semantic similarity determination module 176 may not take into consideration the contents of the sample audio data 204 itself. For example, the semantic similarity determination module 176 may use annotated data 172 comprising the rater ID 220, the audio data ID 206, and the rater-assigned semantic descriptor data 222 to determine the semantic descriptor similarity data 178. Information such as the audio feature data 138 associated with the respective audio data IDs 206 is not processed by this module.

The semantic similarity determination module 176 may use one or more analytical techniques to account for intra-rater variations, inter-rater variations, and so forth. For example, data associated with a particular rater ID 220 may be averaged, outlier values may be discarded, and so forth. In another example, data associated with a particular value of rater-assigned semantic descriptor data 222 may be averaged, outlier values may be discarded, and so forth. In yet another example, data associated with particular sample audio data 204, such as indicated by audio data ID 206 may be averaged, outlier values may be discarded, and so forth.

The semantic similarity determination module 176 may determine the semantic descriptor similarity data 178 based on co-occurrences of rater-assigned semantic descriptors for one or more of the same rater 170, the same audio data ID 206, and so forth. The semantic similarity determination module 176 may implement a neural network that accepts the annotated data 172 and provides as output the semantic descriptor similarity data 178. An unsupervised learning algorithm may be used to process the annotated data 172 and determine co-occurrences. In another implementation one or more statistical techniques may be used to determine the co-occurrences.

In another implementation the semantic similarity determination module 176 may determine the semantic descriptor similarity data 178 using a latent semantic analysis (LSA) algorithm. (See Landauer, T. K., Foltz, P. W., & Laham, D. (1998). Introduction to Latent Semantic Analysis. Discourse Processes, 25, 259-284.)

In one implementation, the semantic similarity determination module 176 may implement a neural network that is learned using a Triplet-Loss approach in which positive rater-assigned semantic descriptors are presumed to be closer to one another than negative rater-assigned semantic descriptors. (See Schroff, Florian et al. (2015). FaceNet: A unified Embedding for Face Recognition and Clustering. arXiv: 1503.03832v3.)

The semantic similarity determination module 176 may implement a distance function comprising the mean of the bi-directional mean of maximum cross-set cosine similarities per (rater-assigned) semantic descriptor used. With this approach, a semantic descriptor 144 in a first set of semantic descriptors 144 is required to be similar to at least one semantic descriptor 144 in a second set of semantic descriptors 144. During assessment, the raters 170 may select semantic descriptors 144 that encode multiple different concepts that are not necessarily semantically related to one another. For example, "amused" and "interested" may be selected by the rater 170 to annotate a presented sample 212, but these semantic descriptors 144 are not semantically related to one another. Continuing the example, it is possible to be "amused" and "disinterested". The awareness of this relationship, and the design of the semantic similarity determination module 176 to consider this kind of semantic relationship allows the semantic similarity determination module 176 to learn relationships between semantic descriptors 144 that are different from a count-based approach. Additionally, the ability of the neural network to utilize multiple semantic descriptors 144 allows for polysemic information to be accommodated.

The neural network may contain one or more pooling layers. For example, multiple embeddings within the neural network may be provided, including a second embedding for each semantic descriptor. A max pooling layer may then be used to select a most appropriate embedding for a given triplet semantic descriptor pair.

In other implementations, the semantic similarity determination module 176 may utilize other techniques to determine the semantic descriptor similarity data 178.

Figure 3:
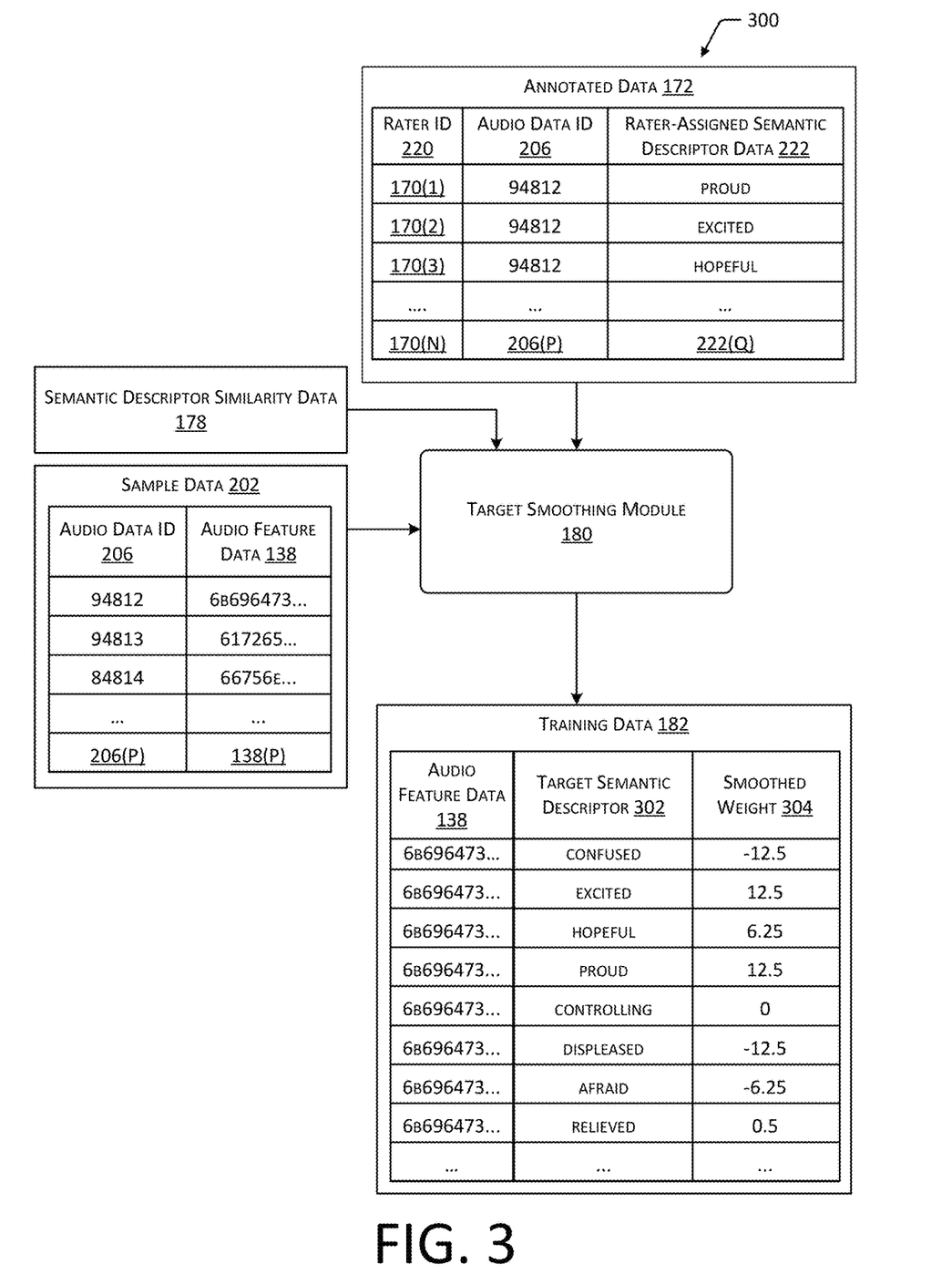
FIG. 3 illustrates determination of training data comprising target semantic descriptors and smoothed weights that may be used to train a neural network, according to one implementation.

FIG. 3 illustrates determination of training data 182 comprising target semantic descriptors and smoothed weights that may be used to train a neural network, according to one implementation.

The target smoothing module 180 accepts as input the annotated data 172, the semantic descriptor similarity data 178, and the sample data 202. The target smoothing module 180 provides as output training data 182. The training data 182 may comprise audio feature data 138, a target semantic descriptor 302, and a smoothed weight 304 for that combination of audio feature data 138 and target semantic descriptor 302. The training data 182 provides a highly reliable set of data that may then be used to train the neural network of the feature analysis module 140.

As mentioned above, a naïve method of training the neural network of the feature analysis module 140 to determine sentiment descriptors 144 could involve the training data comprising the rater-assigned semantic descriptors and counts indicative of how many times (votes) that semantic descriptor 144 was selected by raters 170. However, due to the semantic overlap between semantic descriptors 144, polysemy, and other factors, the resulting accuracy is less than desired.

The target smoothing module 180 distributes the votes indicated in the annotated data 172 across those semantic descriptors 144 that are related based on the similarity values 230 in the semantic descriptor similarity data 178. Positive smoothed weights 304 may be associated with similarity values 230 indicative of a relationship between a pair of sentiment descriptors 144. In some implementations, negative smoothed weights 304 may be associated with similarity values 230 indicative of an anti-relationship between a pair of sentiment descriptors 144.

In one implementation the target smoothing module 180 may group and count the rater-assigned semantic descriptors in the rater-assigned semantic descriptor data 222 that is associated with a particular audio data ID 206. The target smoothing module 180 may then determine, based on the similarity values 230 exceeding a threshold value, one or more semantic descriptors 144 that are associated with each group. The smoothed weight 304 may be calculated by multiplying the count for the group by the similarity value 230 of a related semantic descriptor 144. In other implementations other calculations may be performed to determine the smoothed weight 304. The smoothed weight 304 may comprise a partial weight. The partial weight may comprise a weight of a semantic descriptor 144 as determined from the annotated data 172 that has been distributed across one or more related semantic descriptors 144 as indicated by the semantic descriptor similarity data 178.

In some implementations the target smoothing module 180, or the feature analysis module 140, may implement a prevalence penalization algorithm also known as a prevalence re-weighting algorithm. The prevalence penalization algorithm de-emphasizes those semantic descriptors 144 with large individual values or counts. For example, most audio data from users 104 tends to be relatively neutral in emotional content, resulting in a high prevalence of neutral semantic descriptors 144 with higher weights in the training data 182. By using prevalence penalization, training data 182 is produced or processed into a form that more effectively represents excursions beyond neutral emotions. Without the use of prevalence penalization, training data 182 may result in the feature analysis module 140 predominately reporting neutral semantic descriptors 144, that may be of limited value to the user 102.

The prevalence penalization algorithm may determine a global prevalence value of a semantic descriptor 144 by either an average of the count of rater-assigned semantic descriptors, or a count of times the semantic descriptor 144 appears in a top k list of rater-assigned semantic descriptors. For example, k may be six. As a result, the smoothed weights 304 of the top k target semantic descriptors 302 may be reduced.

The target smoothing module 180 does not necessarily process the sample audio data 204 or associated audio feature data 138. In some implementations the training data 182 determined by the target smoothing module 180 may comprise the audio data ID 206 or audio feature data identifier (ID). For example, the audio feature data identifier may comprise a key or value that refers to particular audio feature data 138. Another module (not shown) may use the audio data ID 206 to retrieve the corresponding sample audio data 204 or audio feature data 138. During training the audio data ID 206 may be used to retrieve one or more of the associated sample audio data 204 or the audio feature data 138.

In some implementations, a first set of annotated data 172 used by the semantic similarity determination module 176 may differ from a second set of annotated data 172 used by the target smoothing module 180. For example, the first set of annotated data 172 may be acquired at a first time, and at a later second time the second set of annotate data 172 is acquired. The size of the first set of the annotated data 172 may also differ from the size of the second set of annotated data 172. For example, the first set of annotated data 172 may be fewer entries than the second set of annotated data 172.

Figure 4:
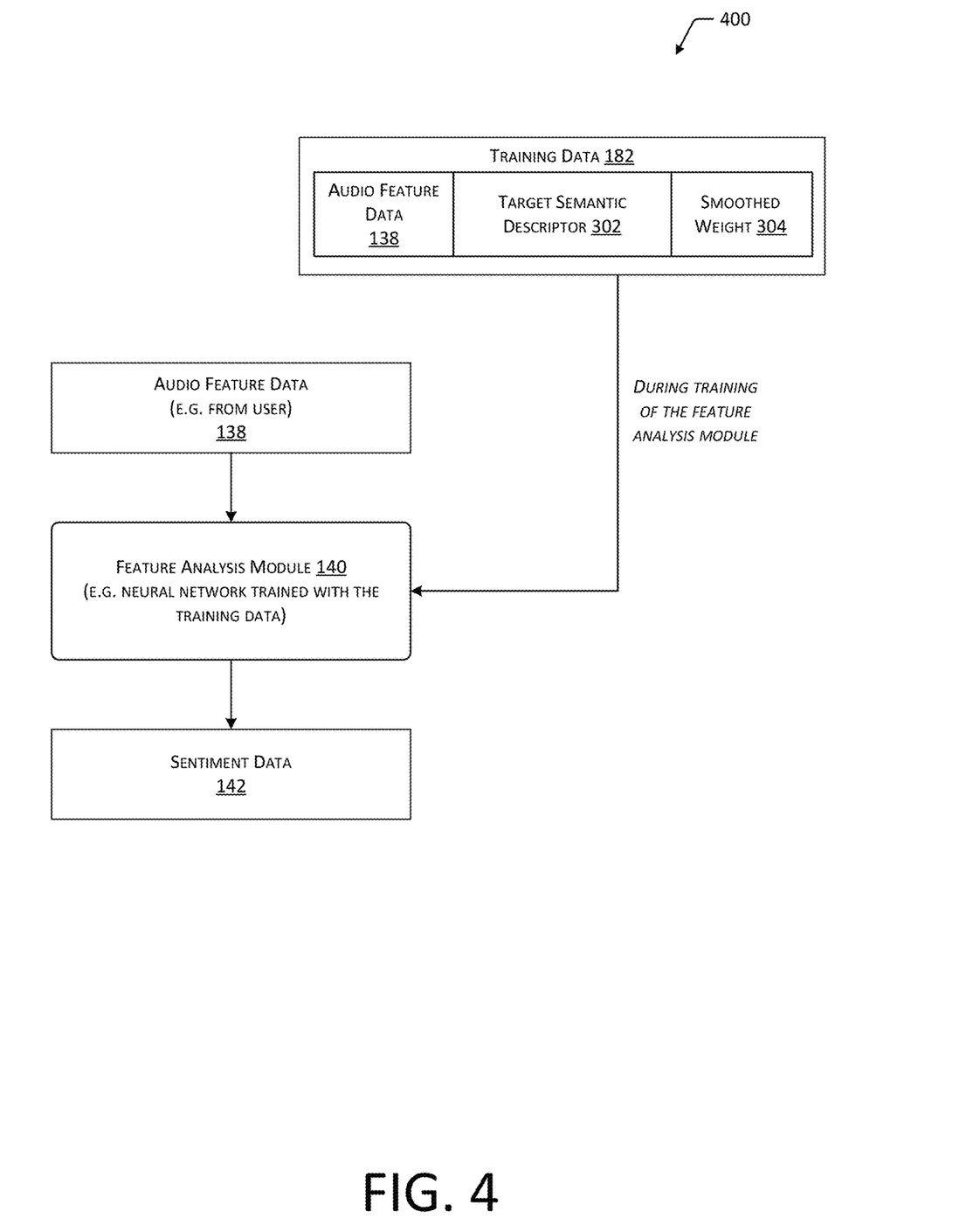
FIG. 4 illustrates training data used to train a feature analysis module to determine sentiment data based on audio feature data, according to one implementation.

FIG. 4 illustrates training data used to train the feature analysis module 140 to determine sentiment data 144 based on audio feature data 138, according to one implementation.

The feature analysis module 140 may comprise a neural network that is trained using supervised learning with the training data 182 providing a labeled set of training examples. During training, the neural network processes the audio feature data 138 as input and generates a predicted sentiment descriptor. A deviation between the predicted sentiment descriptor and the known sentiment data 142 that is associated with the audio feature data 138 is determined, and provided as feedback to the neural network. The feedback may result in the modification of one or more weight values associated with one or more nodes within the neural network. By performing many iterations of processing and feedback using the training data 182, the neural network learns to provide the desired output, as indicated by the target semantic descriptors 302 that are associated with particular audio feature data 138. The training process may be performed using one or more servers.

Once trained, the feature analysis module 140 may accept audio feature data 138 generated from speech 102 associated with the user 104. The neural network within the feature analysis module 140, now trained using the training data 182, produces sentiment data 142 such as one or more sentiment descriptors 144 that are indicative of the emotional state conveyed by the speech 102 of the user 104.

In another implementation, the feature analysis module 140 may be trained using sample audio data 204. In this implementation, the audio feature module 136 may be omitted during use, and the second audio data 134 may be provided as input to the feature analysis module 140.

Figure 5:
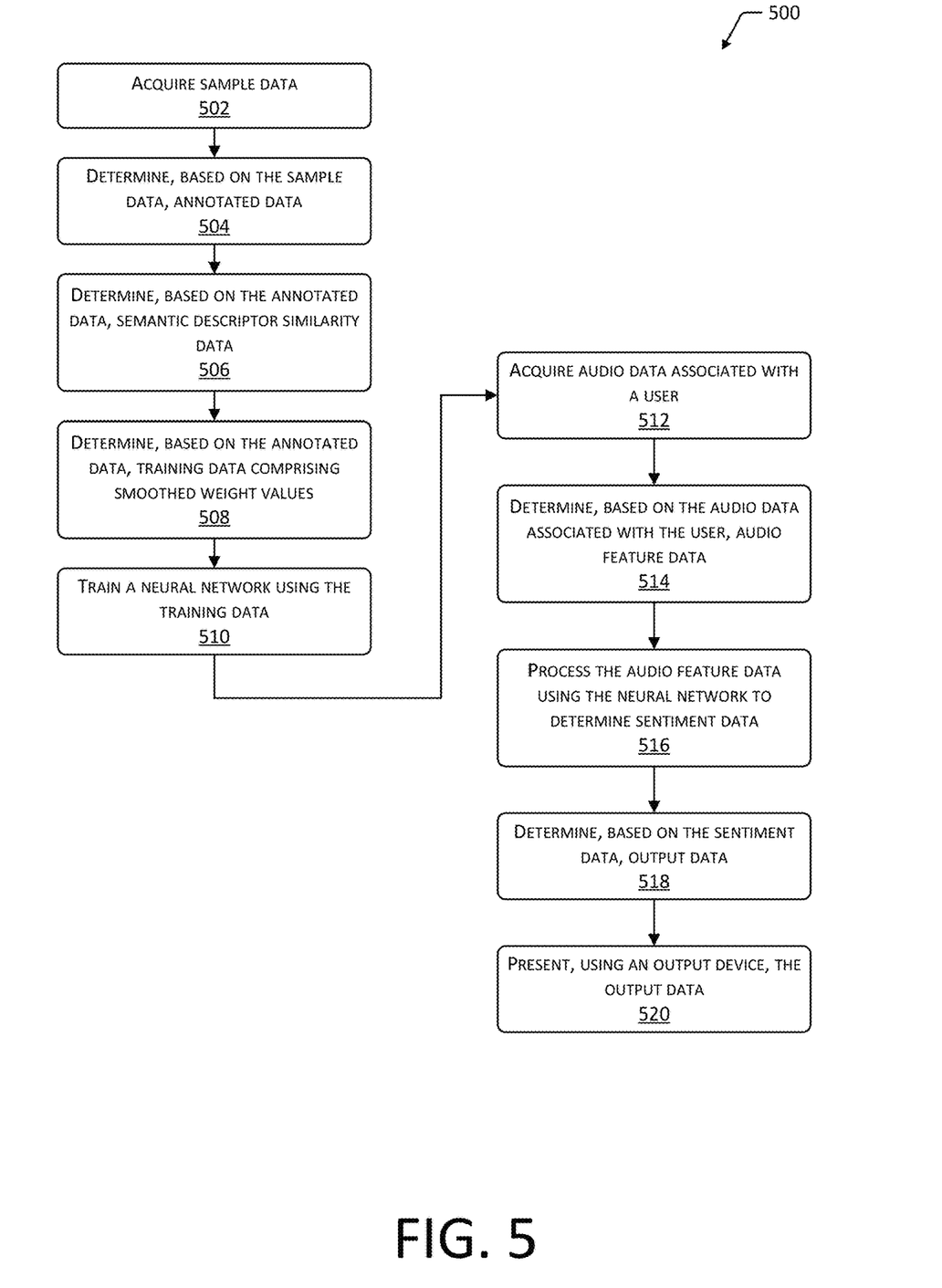
FIG. 5 is a flow diagram of a process to generate sentiment data, according to one implementation.

FIG. 5 is a flow diagram 500 of a process to generate sentiment data 142 that is descriptive of the speech 102 provided by a user 104, according to one implementation. The process may be implemented by one or more devices, such as the computing device 106, a wearable device, one or more servers, and so forth.

At 502, sample data 202 is acquired. In one implementation, a plurality of performers may be recorded and sample audio data 204 produced. In another implementation, users 104 may opt in to provide sample audio data 204 for training usage. To maintain the privacy of the user 104, the sample audio data 204 may be anonymized, limited in duration to a maximum length of time, limited to sample audio data 204 acquired while in a public place, and so forth.

At 504, based on the sample data 202, the annotated data 172 is determined. For example, the plurality of raters 170(1)-(N) listen to the presented samples 212 and provide their input comprising rater-assigned semantic descriptor data 222.

At 506, the semantic descriptor similarity data 178 is determined based on the annotated data 172. For example, the semantic similarity determination module 176 may process at least a portion of the annotated data 172 to generate the semantic descriptor similarity data 178. As described above, the semantic descriptor similarity data 178 provide information indicative of the relationship between sentiment descriptors 144, and is independent of the actual contents of the sample audio data 204.

At 508, training data 182 is determined based on the annotated data 172. For example, the target smoothing module 180 may process at least a portion of the annotated data 172 and use the semantic descriptor similarity data 178 to determine the training data 182.

At 510 a neural network is trained using the training data 182. For example, the neural network of the feature analysis module 140 may be trained using supervised learning and the training data 182 as the input.

At 512, audio data associated with the user 104 is acquired. For example, raw audio data 122 may be acquired by the microphone array 120 of the computing device 106 and may be processed by the voice activity detector module 124, the audio preprocessing module 126, the speech identification module 130, and so forth to generate second audio data 134.

At 514, based on the audio data associated with the user 104, audio feature data 138 is determined. For example, the audio feature module 136 may process the second audio data 134 to determine the audio feature data 138.

At 516, the audio feature data 138 is processed using the neural network to determine the sentiment data 142. For example, the feature analysis module 140 using the neural network trained using the training data 182 processes the audio feature data 138 and generates as output one or more sentiment descriptors 144.

At 518, based on the sentiment data 144, the output data 162 is determined. For example, the computing device 106 may generate the output data 162 comprising HTML instructions that, when processed by a browser engine, generate an image of a GUI. In another example, the output data 162 may comprise an instruction to play a particular sound, generate synthesized speech, and so forth.

At 520, the output data 162 is presented using one or more output devices 164. For example, the GUI may be presented on a display device, a voice user interface comprising synthesized speech may be presented using a speaker, and so forth. The output may include the user interface 108, such as the GUI depicted here that provides information about the sentiment of the user 104.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining a plurality of samples of human speech;
   determining, based on input from a plurality of humans, annotated data comprising:
   the plurality of samples of human speech; and
   for each of the plurality of samples of human speech, a rater-assigned semantic descriptor that is selected from a set of semantic descriptors;
   determining, based on the annotated data, semantic descriptor similarity data that is indicative of a pairwise relationship between individual semantic descriptors in the set of semantic descriptors;
   determining, based on the semantic descriptor similarity data and the annotated data, a set of target semantic descriptors that are associated with each sample of the plurality of samples;
   determining, based on the pairwise relationship between individual semantic descriptors in the set of target semantic descriptors and the annotated data, a set of smoothed weights, wherein each smoothed weight of the set of smoothed weights indicates, for a particular sample associated with a particular rater-assigned semantic descriptor, a set of partial weights associated with a subset of the set of target semantic descriptors, the subset of the set of target semantic descriptors including at least one semantic descriptor other than the particular rater-assigned semantic descriptor;
   training a neural network using at least:
   the plurality of samples of human speech,
   the set of the target semantic descriptors associated with each sample of the plurality of samples, and
   a smoothed weight associated with each of the target semantic descriptors in the set of target semantic descriptors;
   determining audio data acquired from an enrolled user;
   determining one or more output sentiment descriptors by processing the audio data with the neural network trained using the set of target semantic descriptors and the set of smoothed weights;

determining output data based on the one or more output sentiment descriptors; and presenting the output data using an output device.

2. The method of claim 1, the determining the semantic descriptor similarity data comprising processing the annotated data with a second neural network comprising a triplet loss function; and wherein the pairwise relationship is represented by a similarity between pairs of the individual semantic descriptors that is based on one or more of a cosine similarity or a co-occurrence count.

3. The method of claim 1, further comprising:

determining, based on the semantic descriptor similarity data, a set of similarity values between a first target semantic descriptor of the set of target semantic descriptors and one or more second semantic descriptors of the set of semantic descriptors;

determining a count of occurrences of rater-assigned semantic descriptors that are associated with a first sample of human speech of the plurality of samples of human speech; and determining a first weight for the first target semantic descriptor by multiplying the count of occurrences with a similarity value of the set of similarity values associated with the first target semantic descriptor.

4. A method comprising:

determining annotated data comprising:
data associated with a first sample of speech; and
a rater-assigned semantic descriptor;

determining, based on the annotated data, semantic descriptor similarity data that is indicative of a relationship between individual semantic descriptors in a set of semantic descriptors;

determining, based on the semantic descriptor similarity data and the annotated data, a first target semantic descriptor and a second target semantic descriptor that are associated with the first sample;

determining, based on the semantic descriptor similarity data and the annotated data, a first set of weights associated with the first target semantic descriptor and a second set of weights associated with the second target semantic descriptor, wherein the first set of weights indicate a first partial weight associated with the first target semantic descriptor and a second partial weight associated with a third target semantic descriptor, and wherein the second set of weights indicate a third partial weight associated with the second target semantic descriptor and a fourth partial weight associated with a fourth target semantic descriptor;

determining training data comprising:
the data associated with the first sample of speech;
the first target semantic descriptor;
the first set of weights;
the second target semantic descriptor; and
the second set of weights;

processing acquired audio data based on the training data to determine one or more output sentiment descriptors; and presenting output data, using an output device, based on the one or more output sentiment descriptors.

5. The method of claim 4, further comprising:

presenting at least a portion of the first sample of speech to a rater;

receiving input from the rater, wherein the input is indicative of a semantic descriptor from the set of semantic descriptors; and determining the rater-assigned semantic descriptor based on the input.

6. The method of claim 4, wherein the semantic descriptor similarity data is indicative of a pairwise relationship between individual ones of the semantic descriptors in the set of semantic descriptors.

7. The method of claim 4, wherein the semantic descriptor similarity data comprises similarity values indicative of a pairwise similarity between the individual semantic descriptors in the set of semantic descriptors; and the determining the semantic descriptor similarity data comprising:
using the annotated data, training a neural network that employs a triplet loss function.

8. The method of claim 4, the determining the first partial weight and the second partial weight comprising:

determining, based on the semantic descriptor similarity data, a similarity value between the first target semantic descriptor and the second target semantic descriptor;

determining the first set of weights based on the similarity value; and determining the second set of weights based on the similarity value.

9. The method of claim 4, the determining the first set of weights comprising:

determining, based on the semantic descriptor similarity data, a set of similarity values between the first target semantic descriptor and each semantic descriptor of the set of semantic descriptors;

determining a count of occurrences of rater-assigned semantic descriptors that are associated with the first sample of speech; and determining the first set of weights by multiplying the count of occurrences with a similarity value associated with the first target semantic descriptor.

10. The method of claim 4, further comprising:

training a neural network using at least the training data;

determining the acquired audio data based on input from a user;

determining the one or more output sentiment descriptors by processing the acquired audio data with the neural network; and determining the output data based on the one or more output sentiment descriptors.

11. The method of claim 4, wherein the data associated with the first sample of speech comprises one or more of:
audio data acquired using a microphone,
audio identifier data indicative of the audio data,
audio feature data based on the audio data, or
an audio feature data identifier indicative of the audio feature data.

12. The method of claim 4, wherein the semantic descriptor similarity data is indicative of the first target semantic descriptor being anti-related to the third target semantic descriptor; and further wherein:
the first partial weight is a positive value; and
the second partial weight is a negative value.

13. A system comprising:

at least one hardware processor that executes instructions to:

determine annotated data comprising:
data associated with a first set of audio data; and
a second set of rater-assigned semantic descriptors;

determine, based on the annotated data, semantic descriptor similarity data that is indicative of a relationship between individual semantic descriptors in a third set of semantic descriptors;

determine, based on the semantic descriptor similarity data and the annotated data, a fourth set of target semantic descriptors that are associated with the first set of audio data;

determine, based on the semantic descriptor similarity data and the annotated data, a fifth set of weights, wherein the fifth set of weights indicates, for a first target semantic descriptor of the fourth set of target semantic descriptors, a first partial weight associated with the first target semantic descriptor and a second partial weight associated with a second target semantic descriptor of the fourth set of target semantic descriptors; and determine training data comprising:
the data associated with the first set of audio data;
the fourth set of target semantic descriptors; and
the fifth set of weights.

14. The system of claim 13, the instructions to determine the fifth set of weights comprising instructions to:
determine a first set of similarity values, wherein each similarity value of the first set of similarity values is representative of a similarity between pairs of target semantic descriptors within the fourth set of target semantic descriptors;
determine rater data based on the second set of rater-assigned semantic descriptors, wherein the rater data is representative of a count of individual semantic descriptors in the third set of semantic descriptors;
determine, based on the first set of similarity values and the rater data, a first set of partial weights;
determine first average data comprising an average of partial weights associated with a particular rater identifier;
determine second average data comprising an average of partial weights associated with a first portion of the first set of audio data; and
determine the fifth set of weights based on the first average data and the second average data.

15. The system of claim 13, further comprising:
an output device;
an input device; and
instructions to:
present, using the output device, at least a portion of the first set of audio data;
receive, using the input device, input indicative of a semantic descriptor from the third set of semantic descriptors; and
determine a rater-assigned semantic descriptor based on the input.

16. The system of claim 13, wherein the semantic descriptor similarity data is indicative of a pairwise relationship between individual ones of the semantic descriptors in the third set of semantic descriptors.

17. The system of claim 13, the instructions to determine the fifth set of weights comprising instructions to:
determine, based on the semantic descriptor similarity data, a set of similarity values, wherein each similarity value in the set of similarity values is indicative of a similarity between pairs of semantic descriptors of the fourth set of semantic descriptors; and
wherein each of the fifth set of weights is based on a corresponding one of the similarity values of the set of similarity values.

18. The system of claim 13, further comprising:
an input device;
an output device; and
instructions to:
train a neural network using at least the training data;
acquire audio data using the input device;
determine one or more output sentiment descriptors by processing the audio data with the neural network;
determine output data based on the one or more output sentiment descriptors; and
present the output data using the output device.

19. The system of claim 13, wherein the first set of audio data comprises one or more of:
audio data acquired using a microphone,
audio identifier data indicative of the audio data,
audio feature data based on the audio data, or
an audio feature data identifier indicative of the audio feature data.

20. The system of claim 13, wherein the semantic descriptor similarity data is indicative of a first target semantic descriptor in the third set of semantic descriptors being anti-related to a second target semantic descriptor in the third set of semantic descriptors.

* * * * *